United States Patent
Glebov

(10) Patent No.: US 10,114,373 B2
(45) Date of Patent: Oct. 30, 2018

(54) NAVIGATION SYSTEM WITH TRAJECTORY CALCULATION MECHANISM AND METHOD OF OPERATION THEREOF

(71) Applicant: Telenav, Inc., Santa Clara, CA (US)

(72) Inventor: Alexander G. Glebov, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 37 days.

(21) Appl. No.: 15/157,225

(22) Filed: May 17, 2016

(65) Prior Publication Data
US 2017/0336790 A1    Nov. 23, 2017

(51) Int. Cl.
*G05D 1/00* (2006.01)
*G01C 21/00* (2006.01)

(52) U.S. Cl.
CPC ........... *G05D 1/0088* (2013.01); *G01C 21/00* (2013.01); *G05D 2201/0213* (2013.01)

(58) Field of Classification Search
CPC .. G05D 1/0088; G05D 1/0212; G05D 1/0231; G05D 1/101
See application file for complete search history.

(56) References Cited

U.S. PATENT DOCUMENTS

| | | | | |
|---|---|---|---|---|
| 7,649,331 B2* | 1/2010 | Hosoda | ................... | B25J 5/007 318/568.12 |
| 7,702,427 B1* | 4/2010 | Sridhar | .................. | G08G 5/045 701/14 |
| 8,626,434 B1* | 1/2014 | Kornmann | ......... | G01C 21/3638 345/625 |
| 2002/0173905 A1* | 11/2002 | Jin | ......................... | G01C 21/20 701/408 |
| 2009/0212181 A1* | 8/2009 | Riddiford | .............. | G01C 21/26 248/206.2 |
| 2010/0106356 A1* | 4/2010 | Trepagnier | ............ | G01S 17/023 701/25 |
| 2014/0088860 A1* | 3/2014 | Poornachandran | .. | G01C 21/206 701/410 |
| 2015/0353062 A1* | 12/2015 | Breuer | ..................... | B60T 7/22 701/70 |

* cited by examiner

*Primary Examiner* — Behrang Badii
*Assistant Examiner* — Daniel L Greene
(74) *Attorney, Agent, or Firm* — Perspectives Law Group, Corp.

(57) ABSTRACT

A method of operation of a navigation system includes: determining detected information for representing a maneuverable object detected using a device; identifying a directional portion based on the detected information for representing directional portion controlling an object travel vector of the maneuverable object; and calculating with a control circuit an estimated trajectory profile based on the directional portion for predicting movement of the maneuverable object.

20 Claims, 5 Drawing Sheets ns for a navigation system, including: determining detected information for representing a maneuverable object detected using a device; identifying a directional portion based on the detected information for representing directional portion controlling an object travel vector of the maneuverable object; and calculating an estimated trajectory profile based on the directional portion for predicting movement of the maneuverable object.

NAVIGATION SYSTEM WITH TRAJECTORY CALCULATION MECHANISM AND METHOD OF OPERATION THEREOF

TECHNICAL FIELD

An embodiment of the present invention relates generally to a navigation system, and more particularly to a system with a trajectory calculation mechanism.

BACKGROUND ART

Modern consumer and industrial electronics, especially devices such as graphical computing systems, self-driving vehicles, cellular phones, portable digital assistants, and combination devices, are providing increasing levels of functionality to support modern life including location-based information or navigating services. Research and development in the existing technologies can take a myriad of different directions.

As users become more empowered with the growth of mobile communication technology, new and old paradigms begin to take advantage of this new space. One such space is navigation functions for vehicles. However, in the midst of increase in information readily available to the user, processing for movement of other objects has yet been fully utilized.

Thus, a need still remains for a navigation system with a trajectory calculation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: determining detected information for representing a maneuverable object detected using a device; identifying a directional portion based on the detected information for representing directional portion controlling an object travel vector of the maneuverable object; and calculating with a control circuit an estimated trajectory profile based on the directional portion for predicting movement of the maneuverable object.

An embodiment of the present invention provides a navigation system, including: a control circuit configured to: determine detected information for representing a maneuverable object detected using a device, identify a directional portion based on the detected information for representing directional portion controlling an object travel vector of the maneuverable object, calculate an estimated trajectory profile based on the directional portion for predicting movement of the maneuverable object; and a storage circuit, coupled to the control circuit, configured to store the estimated trajectory profile.

An embodiment of the present invention provides a non-transitory computer readable medium including instructions for a navigation system, including: determining detected information for representing a maneuverable object detected using a device; identifying a directional portion based on the detected information for representing directional portion controlling an object travel vector of the maneuverable object; and calculating an estimated trajectory profile based on the directional portion for predicting movement of the maneuverable object.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
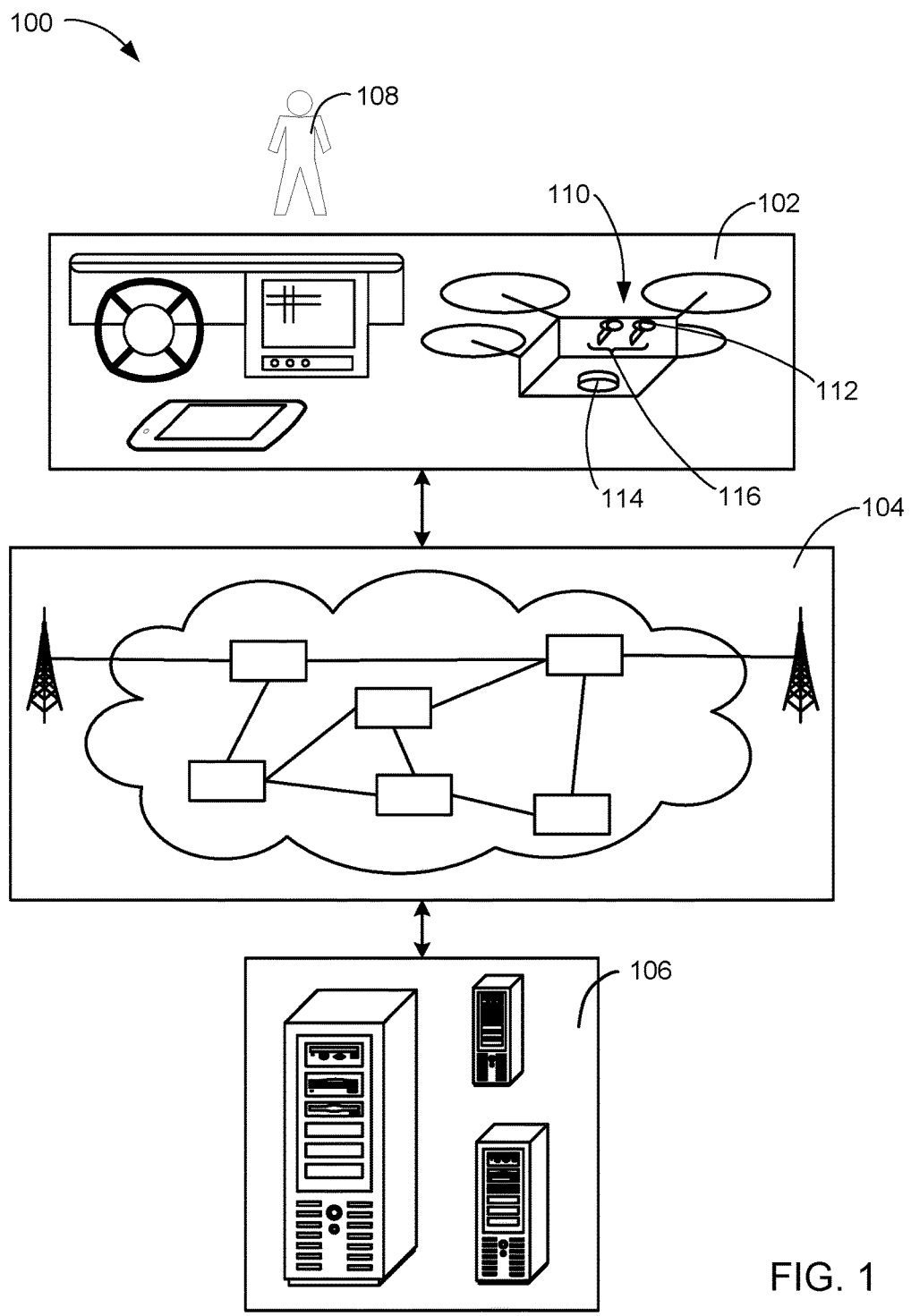
FIG. 1 is a navigation system with a trajectory calculation mechanism in an embodiment of the present invention.

The following embodiments can be for predicting movements of a maneuverable object based on representation of a propulsion portion, a direction portion, or a combination thereof according to detected information detected by a device in real-time. The device can detect information using a surroundings detector, such as a camera set detecting a three-dimensional visual image or a distance detector detecting a point-cloud with corresponding distances from the detector.

The detected information can be processed to calculate, determine, generate, or a combination thereof for directional characteristic, estimated trajectory profile, or a combination thereof for predicting resulting movements caused by the propulsion portion, the direction portion, or a combination thereof. The estimated trajectory profile can further provide a basis for generating a motion plan profile for the device for motion planning in response to the predicted movement of the maneuverable object.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as or include software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof to control one or more of the hardware units or circuits.

Referring now to FIG. 1, therein is shown a navigation system 100 with a trajectory calculation mechanism in an embodiment of the present invention. The navigation system 100 can include a first device 102, such as a client or a server, connected to a second device 106, such as a client or server. The first device 102 can communicate with the second device 106 with a network 104, such as a wireless or wired network.

The navigation system 100 can include a system for controlling or guiding vehicles or moving objects. For example, the first device 102 can be of any of a variety of computing devices, such as a cellular phone, personal digital assistant, a notebook computer, a wearable device, internet of things (IoT) device, automotive telematics navigation system, or other multi-functional mobile communication or entertainment device. As a more specific example, the first device 102 can include an infotainment device integral with a vehicle or an end-user device within or associated with a passenger in the vehicle.

Also for example, the first device 102 can include an autonomous vehicle, a remote-controlled maneuverable object, a passenger controlled or maneuvered vehicle, a portion therein, or a combination thereof. As a more specific example, the first device 102 can include a self-driving car, a self-maneuvering or remote controlled drone, or a combination thereof.

The first device 102 can couple, either directly or indirectly, to the network 104 to communicate with the second device 106 or can be a stand-alone device. The first device 102 can further be separate form or incorporated with a vehicle, such as a car, truck, bus, drone, or train.

For illustrative purposes, the navigation system 100 is described with the first device 102 as a self-driving car, although it is understood that the first device 102 can be different types of devices. For example, the first device 102 can also be a flying drone, a non-passenger vehicle, a controller thereof, or a combination thereof.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof. As a more specific example, the second device 106 can include a server, a device for a service provider, a traffic or device controller, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can be used by or interact with an operator 108. The operator 108 can include a person or an entity accessing or utilizing the navigation system 100 or a device therein. For example, the operator 108 can include a person controlling, maneuvering, or operating the first device 102. Also for example, the operator 108 can access or utilize the second device 106 through the first device 102.

The navigation system 100 can receive a control input from the operator 108. The control input can include a stimulus, an input, an interaction, or a combination thereof generated, provided, controlled, or a combination thereof by the operator 108 to the navigation system 100 or a device therein, such as the first device 102, the second device 106, or a combination thereof.

The navigation system 100 can include and utilize a surroundings detector 110. The surroundings detector 110 is a circuit, a device, a portion therein, or a combination thereof configured to detect information regarding nearby physical surroundings or environment. The first device 102 can include the surroundings detector 110. The first device 102 can use the surroundings detector 110 to detect information regarding nearby physical surroundings or environment of the first device 102.

The surroundings detector 110 can provide a variety information, such as visual information, distance readings or mappings, or a combination thereof regarding an object, an obstacle, a road, a structure, ground or earth, horizon, a person or a being, an entity, or a combination thereof around the surroundings detector 110. The surroundings detector 110 can provide information relative to a line-of-sight (LOS) associated thereto. For example, the surroundings detector 110 can include a three-dimensional (3D) detector, a visual detector 112, a distance detector 114, or a combination thereof.

The visual detector 112 is a circuit, an equipment, a device, a portion therein, or a combination thereof configured to detect or gather visual information. The visual detector 112 can include one or more cameras for taking visual images of the environment or surroundings thereof. The visual detector 112 can take or produce one or more visual images of the environment or surroundings thereof.

The visual detector 112 can include a camera set 116. The camera set 116 is a collection of visual detectors configured to detect or gather visual information. The camera set 116 can include a 3D imaging system or camera. The camera set 116 can be configured to provide visual information along with depth, distance, relative positioning, or a combination thereof in three dimensions.

The distance detector 114 is a circuit, an equipment, a device, a portion therein, or a combination thereof configured to measure or determine distance between the detector and surfaces in a specific range. The distance detector 114 can measure or determine distances corresponding to an outline, a surface contour, a shape, an orientation, or a combination thereof for detected targets. For example, the distance detector 114 can include a radar, a LIDAR, a sonar device, a range-finder, other imaging or surveying device, or a combination thereof.

Figure 2:
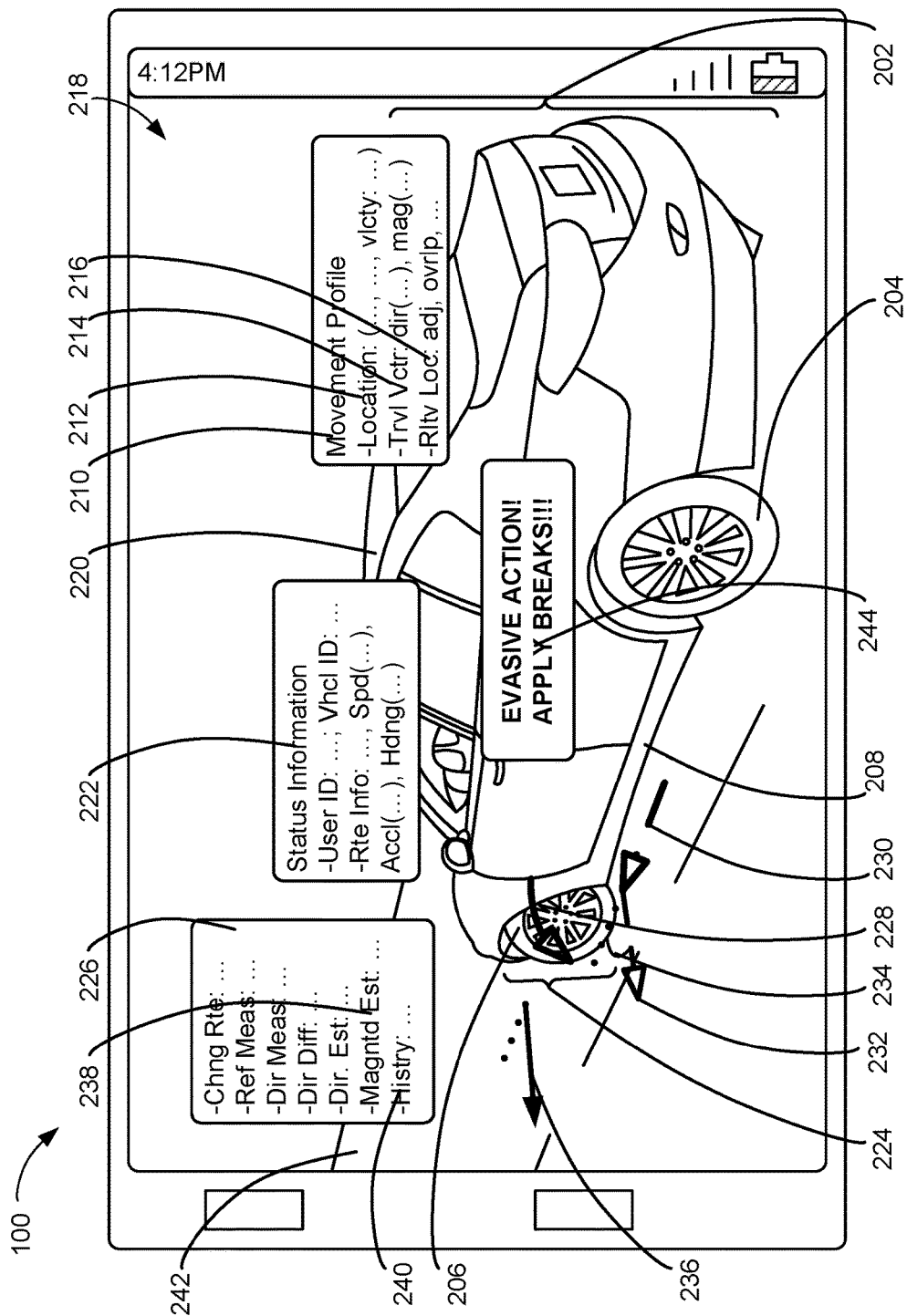
FIG. 2 is an example of a display interface of the navigation system.

Referring now to FIG. 2, therein is shown an example of a display interface of the navigation system 100. The navigation system 100 can show a maneuverable object 202. The maneuverable object 202 is a structure capable of self-propelled physical movement or displacement or a representation of such structure. For example, the maneuverable object 202 can include a terrain vehicle, such as a car or a truck, a flying vehicle, such as a helicopter or a flying drone, or a combination thereof.

The maneuverable object 202 can be separate from the first device 102, or a vehicle or a structure associated thereto.

The maneuverable object 202 can be in spatial relationship to the first device 102 or the vehicle or structure associated thereto. For example, the maneuverable object 202 can be within a threshold distance of, be within a specific area relative to, have an orientation relative to, or a combination thereof in comparison to the first device 102 or the vehicle or structure associated thereto.

The maneuverable object 202 can include a propulsion portion 204, a directional portion 206, a reference portion 208, or a combination thereof. The propulsion portion 204 is a segment or a part of the maneuverable object 202 used to provide or enable the physical forces necessary to physically move or displace the maneuverable object 202. For example, the propulsion portion 204 can include a driving wheel, such as the front wheels in a front-wheel-drive (FWD) vehicle or the rear wheels in a rear-wheel drive vehicle. Also for example, the propulsion portion 204 can include a rotor, a propeller or blades thereof, a thruster, an engine or a motor, or a combination thereof.

The directional portion 206 is a segment or a part of the maneuverable object 202 used to steer or control direction of the physical movement or the physical forces causing the movement. For example, the directional portion 206 can include front wheels of a car or a truck, a rudder or a flap, or a combination thereof.

Also for example, the maneuverable object 202 can include one portion, part, or a combination thereof acting as both the directional portion 206 and the propulsion portion 204. As a more specific example, the front wheels of the FWD vehicle can be both the directional portion 206 and the propulsion portion 204. Also as a more specific example, a set of propellers or thrusters having a specific arrangement and coordination can be both the directional portion 206 and the propulsion portion 204. The force generated by each of the propellers or thrusters can be coordinated to function as the directional portion 206, such as for moveable jet engines or quad-copters.

The reference portion 208 is a segment or a part of the maneuverable object 202 used or known to provide a structure to the maneuverable object 202. For example, the reference portion 208 can include a body, a chassis, a frame, a nose or a hood, a surface, or a combination thereof.

The reference portion 208 can be specific to each type or instance of the maneuverable object 202. The reference portion 208 can be characterized and recognized using a template or a threshold of shapes, orientations, colors, relative locations, markers, materials, or a combination thereof.

The navigation system 100 can process an object movement profile 210. The object movement profile 210 is a description of overall physical movement or displacement of the maneuverable object 202 or factors associated thereto up to or at a current time. The object maneuverable object 202 can describe information associated with overall body or mass of the maneuverable object 202, such as for a center-point or center mass, for the reference portion 208, or a combination thereof.

For example, the object movement profile 210 can include an object location 212, an object travel vector 214, an object-relative relationship 216, or a combination thereof. The object location 212 is a description of geographical position of the maneuverable object 202. The object location 212 can describe a position, an orientation, or a combination thereof of the maneuverable object 202, the overall body or mass thereof, the center point or mass thereof, the reference portion 208, or a combination thereof.

The object location 212 can be represented as a coordinate, such as for latitude-longitude or global positioning system (GPS). The object location 212 can include can include the current location information, a series of location information occurring in the past or up to the current time as a history or tracking information, or a combination thereof.

The object travel vector 214 is a heading or a bearing associated with the movement of the maneuverable object 202 at the current time, before the current time, leading up to the current time, or a combination thereof. The object travel vector 214 can include a direction component of acceleration, velocity, or a combination thereof for the maneuverable object 202. The object movement profile 210 can further include a magnitude of the displacement or the force at or leading up to the current time, preceding the current time, or a combination thereof corresponding to the object travel vector 214.

The object travel vector 214 can be controlled by the directional portion 206. The object travel vector 214 can further correspond to or can be derived from observations or characteristics of the directional portion 206. The magnitude can be controlled by the propulsion portion 204. The magnitude can similarly correspond to or associated with the propulsion portion 204.

The object-relative relationship 216 is a description of a physical connection or association between the maneuverable object 202 and the first device 102 or a vehicle or a structure associated thereto. The object-relative relationship 216 can include a vector between the maneuverable object 202 and the first device 102 or a vehicle or a structure associated thereto, a difference in coordinate or position between the two corresponding points, an angle thereof relative to a reference direction or a direction of travel, or a combination thereof.

The object-relative relationship 216 can further include location or existence of the maneuverable object 202 in a specific or predetermined area or location relative to the first device 102 or a vehicle or a structure associated thereto, such as a blind spot, front or behind within the same lane, or a combination thereof. The object-relative relationship 216 can further identify or categorize location of the maneuverable object 202 relative to the first device 102 or a vehicle or a structure associated thereto.

The object movement profile 210 can be determined by the navigation system 100 or by one or more devices therein. For example, the object movement profile 210 can be calculated based on observing, detecting, locating, or a combination thereof for the maneuverable object 202 using the first device 102, the second device 106 of FIG. 1, or a combination thereof. Also for example, the navigation system 100 can process the object movement profile 210 reporting movement or location of each vehicle themselves. The first device 102, the second device 106, or a combination thereof can determine the object movement profile 210 by receiving the object movement profile 210 from the maneuverable object 202.

As a more specific example, the navigation system 100 can process the object movement profile 210 based on an object movement indicator 218. The object movement indicator 218 can include information providing basis for processing the object movement profile 210 regarding a vehicle. The object movement indicator 218 can include information such as detected information 220, status information 222, or a combination thereof.

The detected information 220 can include information from the surroundings detector 110 of FIG. 1 corresponding to the maneuverable object 202. The detected information 220 can include information observed or detected by the first device 102 regarding the maneuverable object 202 having object-relative relationship to the first device 102. For example, the detected information 220 can include visual image, mapping information, or a combination thereof.

The visual image can include visual information or capture of the maneuverable object 202. The visual image can include one or more picture, a video clip, 2D image, 3D image, or a combination thereof including or of the maneuverable object 202. The visual image can be generated or captured using the visual detector 112 of FIG. 1 or the camera set 116 of FIG. 1.

The mapping information can include distance information for objects or surfaces. The mapping information can be distance between the surroundings detector 110 and objects or surfaces within LOS of the surroundings detector 110. The mapping information can be similar to a topology or contour map. The mapping information can include a point cloud from the distance detector 114.

The status information 222 can include information generated by a reporting device regarding movement, position, orientation, acceleration, speed, heading, or a combination thereof of the reporting device itself. The status information 222 can include a self-generated report.

The navigation system 100 can process the object movement indicator 218 to determine a directional characteristic 224. The directional characteristic 224 is a representation of the directional portion 206, the propulsion portion 204, or a combination thereof in the object movement indicator 218 or a trait or detail of the representation. The directional characteristic 224 can include portions of the detected information 220 corresponding to the directional portion 206, the propulsion portion 204, or a combination thereof.

For example, the directional characteristic 224 can include information regarding a wheel, a rotor, propulsion portion, or a combination thereof. As a more specific example, the directional characteristic 224 can include information regarding visual appearance regarding the propulsion portion 204, the directional portion 206, or a combination thereof, such as in shape, color, location, relative physical arrangement, or a combination thereof. The directional characteristic 224 can be for recognizing the propulsion portion 204, the directional portion 206, or a combination thereof.

Also as a more specific example, a shape, an orientation, a color, a density, a blur size, a clarity, a difference thereof in comparison to reference or other portions, or a combination thereof. The directional characteristic 224 can include visual indications for information for recognizing direction, magnitude, heading, acceleration, speed, force, or a combination thereof specific to the corresponding portion, such as the propulsion portion 204, the directional portion 206, or a combination thereof. The directional characteristic 224 can be based on, in comparison to, or relative to a predetermined reference, the reference portion 208, or a combination thereof.

The navigation system 100 can process the object movement indicator 218 to calculate an estimated trajectory profile 226. The estimated trajectory profile 226 is information associated with prediction of physical movement of the maneuverable object 202. The navigation system 100 can calculate the estimated trajectory profile 226 using information from the surroundings detector 110.

The navigation system 100 can calculate the estimated trajectory profile 226 based on the object movement indicator 218 including the detected information 220. The estimated trajectory profile 226 can include a portion change rate 228, a reference measurement 230, a directional measurement 232, a directional difference 234, an estimated object direction 236, a magnitude estimate 238, a portion-movement history 240, or a combination thereof.

The reference measurement 230 is an indication regarding a physical characteristic of the reference portion 208. The reference measurement 230 can be specific to the reference portion 208 within the maneuverable object 202. The reference measurement 230 can correspond to a physical orientation or a directional position of the maneuverable object 202 or a force or influence associated thereto.

The reference measurement 230 can correspond to the reference portion 208 at the current time or up to the current time. The reference measurement 230 can be processed from the reference portion 208, the propulsion portion 204, the directional portion 206, or a combination thereof within the detected information 220.

For example, the reference measurement 230 can include an orientation, a heading, a configuration, an angle relative to a reference direction or surface, such as the ground or an axis, a relative position, or a combination thereof for the chassis, the frame, the body, the casing, or a combination of the maneuverable object 202. Also for example, the reference measurement 230 can include lowest or average rotational speed of rotors or propeller blades amongst multiple rotors or propellers.

The directional measurement 232 is an indication regarding a physical characteristic of the directional portion 206. The directional measurement 232 can correspond to a physical orientation or a directional position of the directional portion 206 or a force or influence associated thereto.

For example, the directional measurement 232 can include an orientation, a heading, a configuration, an angle relative to the reference direction or surface, a relative position, or a combination thereof for the front wheels, the rudders, the flaps, or a combination thereof. Also for example, the directional measurement 232 can include highest rotational speed of rotors or propeller blades amongst multiple rotors or propellers along with identification or position of the corresponding one or more propellers or rotors.

The directional difference 234 is a comparison between the reference measurement 230 and the directional measurement 232. The directional difference 234 can include a calculated difference between the directions or orientations, the magnitudes, the positions, the vectors, or a combination thereof corresponding to the reference measurement 230 and the directional measurement 232.

The portion change rate 228 is a variation in the directional measurement 232 over time. The portion change rate 228 can be associated with an acceleration or a force changing the directional portion 206, the propulsion portion 204, or a combination thereof. The portion change rate 228 can be based on comparing instances or portions of the detected information 220 over time or up to the current time. The portion change rate 228 can correspond to a rate of change in alignment of the wheels or rudders or flaps or rotational plane, in rotational speed of one or more the rotors, or a combination thereof.

The estimated object direction 236 is a prediction regarding a course for movement of the maneuverable object 202 overall, immediately after the current time, occurring at the current time, caused by or resulting from the directional portion 206, the propulsion portion 204, or a combination at the current time, or a combination thereof. The estimated object direction 236 can be an estimate of a location or a direction regarding future or subsequent movement of the maneuverable object 202 overall or the reference portion 208 thereof.

The estimated object direction 236 can be based on the detected information 220, the directional measurement 232, the directional difference 234, the portion change rate 228, or a combination thereof. The estimated object direction 236 can include an estimated trajectory of the maneuverable object 202 based on one or more specific portions of the maneuverable object 202 according to the detected information 220.

The magnitude estimate 238 is prediction regarding a degree or an amount of force or likely displacement of the course for movement for the maneuverable object 202. The magnitude estimate 238 can be similar to the estimated object direction 236 but for the magnitude. The magnitude estimate 238 and the estimated object direction 236 can together form a vector associated with the estimated trajectory. The magnitude estimate 238 can be for movement of the maneuverable object 202 overall, immediately after the current time, occurring at the current time, caused by or resulting from the directional portion 206, the propulsion portion 204, or a combination at the current time, or a combination thereof.

The magnitude estimate 238 can correspond to a rate or a duration corresponding to the maneuverable object 202 reaching a location regarding future or subsequent movement of the maneuverable object 202 overall or the reference portion 208 thereof. The magnitude estimate 238 can be based on the detected information 220, the directional measurement 232, the directional difference 234, the portion change rate 228, or a combination thereof. The magnitude estimate 238 can correspond to a rate of travel over the estimated trajectory of the maneuverable object 202 based on one or more specific portions of the maneuverable object 202 according to the detected information 220.

The portion-movement history 240 can include a record of previously occurring instances of the directional measurement 232, the propulsion portion 204, the directional portion 206, the directional difference 234, or a combination thereof. The portion-movement history 240 can include a recording corresponding to one or more specific portions of the maneuverable object 202, such as the propulsion portion 204, the directional portion 206, or a combination thereof.

The navigation system 100 can use the portion-movement history 240 to characterize the maneuverable object 202 or movements thereof. Details regarding the estimated trajectory profile 226 are discussed below.

The navigation system 100 can further include or process map information 242. The map information 242 can include representations of physical or geographical environment. The map information 242 can include representations regarding roads, surface, segments, nodes, intersections, objects or establishments or structures, locations thereof, geographic relationship thereof, traffic information, or a combination thereof.

The navigation system 100 can generate a motion plan profile 244 for the first device 102 or a vehicle or an object associated thereto based on the estimated trajectory profile 226 of the maneuverable object 202, the map information 242, or a combination thereof. The motion plan profile 244 is information regarding future, subsequent, or responsive movement of the first device 102 or a vehicle or object associated thereto.

The motion plan profile 244 can be for navigating or maneuvering the first device 102 or a vehicle or object associated thereto in response to, based on, or a combination thereof for the estimated trajectory profile 226. For example, the motion plan profile 244 can include a notification regarding a necessary, required, or recommended action or course for movement for the first device 102 or a vehicle or object associated thereto.

Also for example, the motion plan profile 244 can include a step, a command, an instruction, a control signal, a sequence thereof, or a combination thereof for performing, implementing, or executing one or a sequence of specific maneuvers for the first device 102 or a vehicle or object associated thereto. As a more specific example, the motion plan profile 244 can include specific controls for maneuvering the first device 102 including a self-maneuvering or a remote controlled vehicle or drone.

Figure 3:
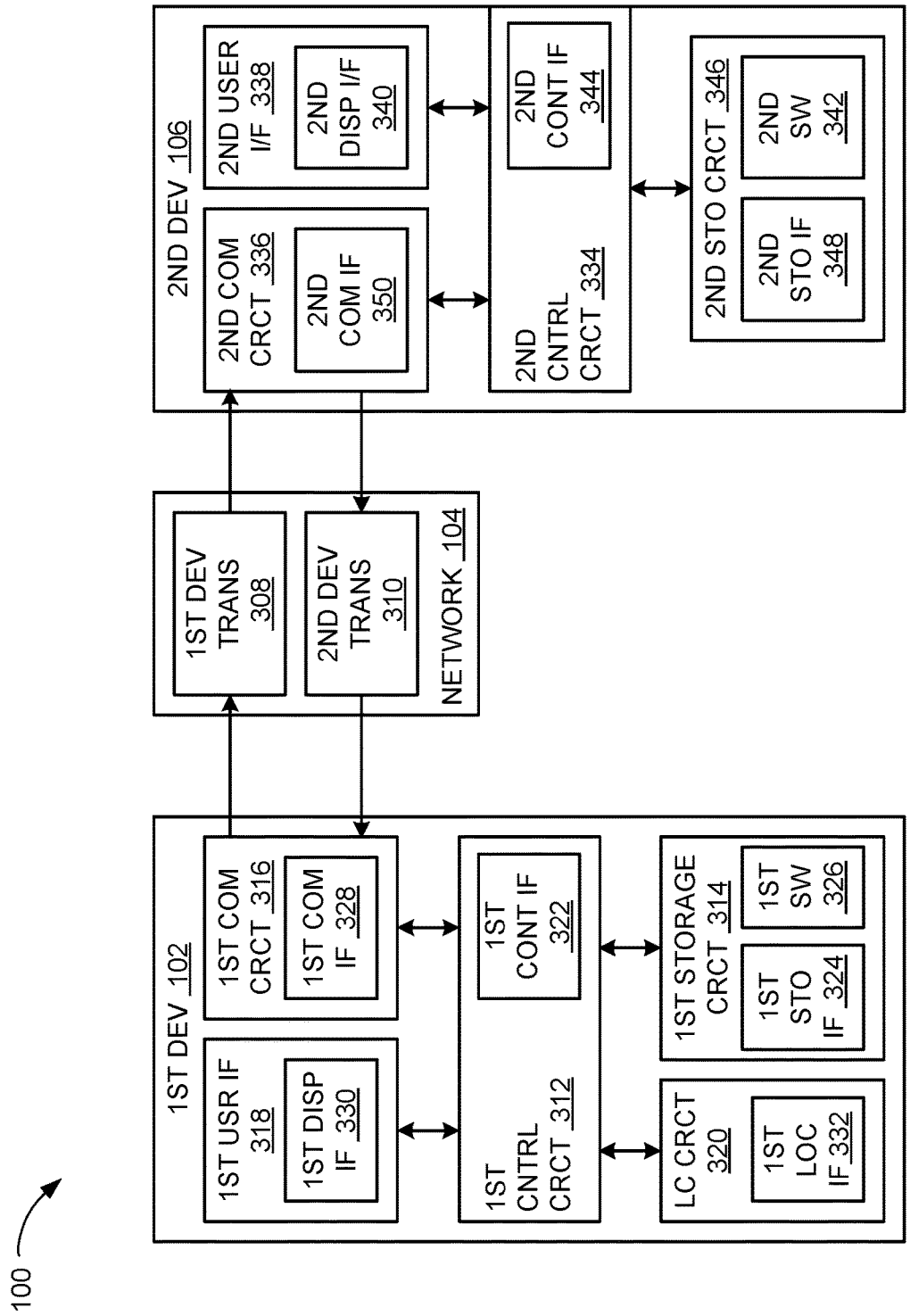
FIG. 3 is an exemplary block diagram of the navigation system.

Referring now to FIG. 3, therein is shown an exemplary block diagram of the navigation system 100. The navigation system 100 can include the first device 102, the network 104, and the second device 106. The first device 102 can send information in a first device transmission 308 over the network 104 to the second device 106. The second device 106 can send information in a second device transmission 310 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, and a first user interface 318, and a location circuit 320. The first control circuit 312 can include a first control interface 322. The first control circuit 312 can execute a first software 326 to provide the intelligence of the navigation system 100.

The first control circuit 312 can be implemented in a number of different manners. For example, the first control circuit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 can permit the first device 102 to communicate with the second device 106 of FIG. 1, an attachment, such as a peripheral device or a desktop computer, and the network 104.

The first communication circuit 316 can also function as a communication hub allowing the first device 102 to function as part of the network 104 and not limited to be an end point or terminal circuit to the network 104. The first communication circuit 316 can include active and passive components, such as microelectronics or an antenna, for interaction with the network 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control circuit 312 can operate the first user interface 318 to display information generated by the navigation system 100. The first control circuit 312 can also execute the first software 326 for the other functions of the navigation system 100, including receiving location information from the location circuit 320. The first control circuit 312 can further execute the first software 326 for interaction with the network 104 via the first communication circuit 316.

The location circuit 320 can generate location information, current heading, current acceleration, and current speed of the first device 102, as examples. The location circuit 320 can be implemented in many ways. For example, the location circuit 320 can function as at least a part of the global positioning system, an inertial navigation system, a cellular-tower location system, a pressure location system, or any combination thereof. Also, for example, the location circuit 320 can utilize components such as an accelerometer or global positioning system (GPS) receiver.

The location circuit 320 can include a first location interface 332. The first location interface 332 can be used for communication between the location circuit 320 and other functional units or circuits in the first device 102. The first location interface 332 can also be used for communication external to the first device 102.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the location circuit 320. The first location interface 332 can be implemented with technologies and techniques similar to the implementation of the first control circuit 312.

The first device 102 can further include the surroundings detector 110 of FIG. 1. The surroundings detector 110 can be coupled to the first control circuit 312, the first user interface 318, the first communication circuit 316, the first storage circuit 314, or a combination thereof. The surroundings detector 110 can interact with other circuits through one or more of the interfaces corresponding thereto.

For example, the surroundings detector 110 including one or more of the visual detector 112 of FIG. 1, one or more of the distance detector 114 of FIG. 1, or a combination thereof can be controlled by the first control circuit 312. Also for example, the detected information 220 of FIG. 2 from the surroundings detector 110 can be stored on the first storage circuit 314, communicated to another device using the first communication circuit 316, or a combination thereof.

The first device 102 can further include mechanical or physical controllers (not shown), such as actuators or motors, for applying physical forces or physically moving structures therein or associated thereto. For example, the first device 102 can include the mechanical or physical controllers for controlling movement or maneuvering of the first device 102 or a vehicle or an object associated thereto.

As a more specific example, the first device 102 can include the mechanical or physical controllers for steering or controlling movement heading, for controlling throttle or acceleration, for controlling deceleration or stop, for controlling visual or audible indicators, for controlling other peripheral functions, or a combination thereof according to control signals or results of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control circuit 334 can execute a second software 342 to provide the intelligence of the second device 106 of the navigation system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the navigation system 100, including operating the second communication circuit 336 to communicate with the first device 102 over the network 104.

The second control circuit 334 can be implemented in a number of different manners. For example, the second control circuit 334 can be a processor, an embedded processor, a microprocessor, hardware control logic, a hardware finite state machine (FSM), a digital signal processor (DSP), or a combination thereof.

The second control circuit 334 can include a second control interface 344. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the navigation system 100 is shown with the second storage circuit 346 as a single hierarchy storage system, although it is understood that the navigation system 100 can have the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 can permit the second device 106 to communicate with the first device 102 over the network 104.

The second communication circuit 336 can also function as a communication hub allowing the second device 106 to function as part of the network 104 and not limited to be an end point or terminal unit or circuit to the network 104. The second communication circuit 336 can include active and passive components, such as microelectronics or an antenna, for interaction with the network 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second control interface 344.

The first communication circuit 316 can couple with the network 104 to send information to the second device 106 in the first device transmission 308. The second device 106 can receive information in the second communication circuit 336 from the first device transmission 308 of the network 104.

The second communication circuit 336 can couple with the network 104 to send information to the first device 102 in the second device transmission 310. The first device 102 can receive information in the first communication circuit 316 from the second device transmission 310 of the network 104. The navigation system 100 can be executed by the first control circuit 312, the second control circuit 334, or a combination thereof. For illustrative purposes, the second device 106 is shown with the partition having the second user interface 338, the second storage circuit 346, the second control circuit 334, and the second communication circuit 336, although it is understood that the second device 106 can have a different partition. For example, the second software 342 can be partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 4:
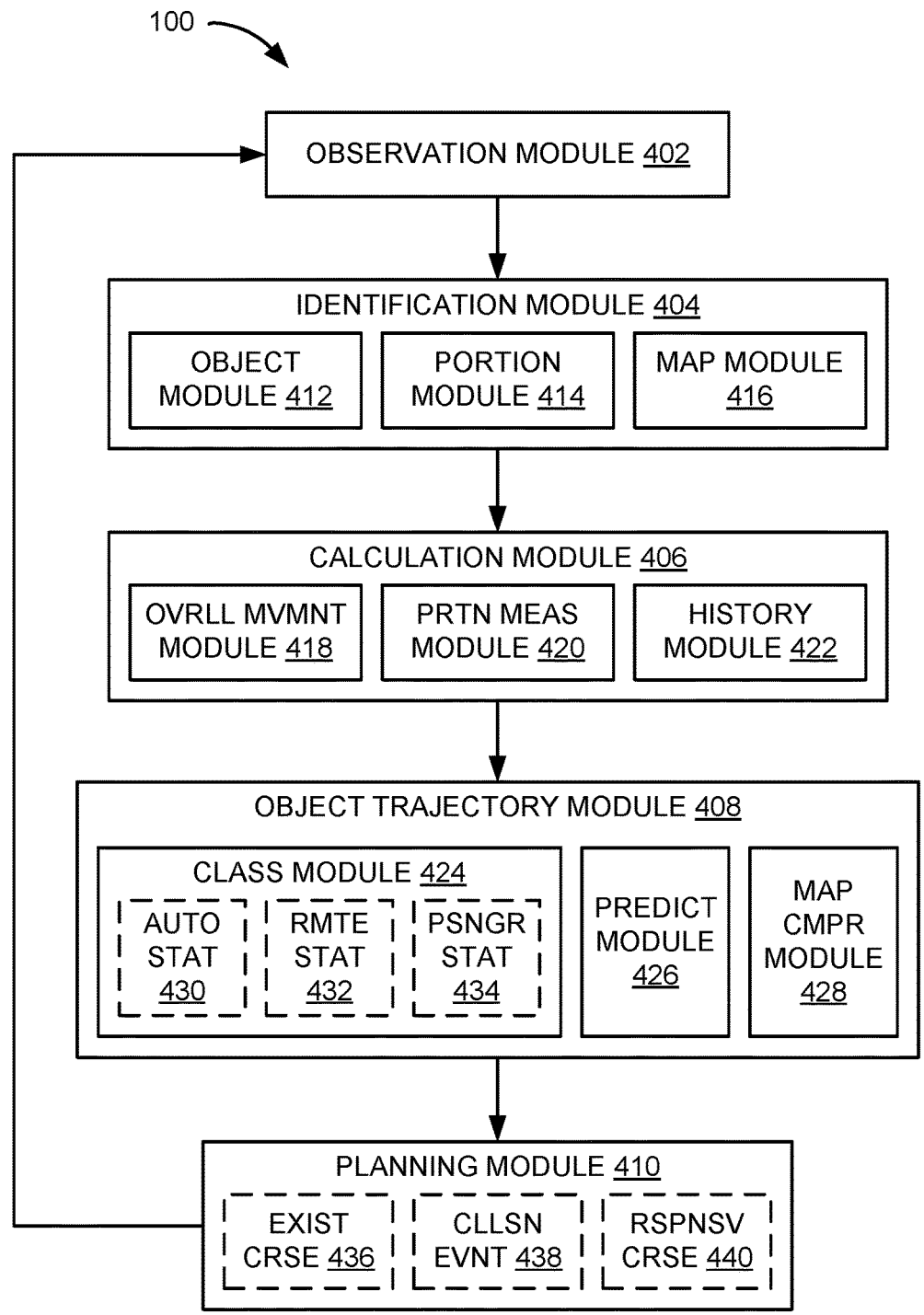
FIG. 4 is a control flow of the navigation system.

Referring now to FIG. 4, therein is shown a control flow of the navigation system 100. The navigation system 100 can include an observation module 402, an identification module 404, a calculation module 406, an object trajectory module 408, a planning module 410, or a combination thereof.

The observation module 402 can be coupled to the identification module 404. The identification module 404 can be coupled to the calculation module 406. The calculation module 406 can be coupled to the object trajectory module 408. The object trajectory module 408 can be coupled to the planning module 410. The planning module 410 can be further coupled to the observation module 402.

The modules can be coupled using wired or wireless connections, by having an output of one module as an input of the other module, by having operations of one module influence operation of the other module, or a combination thereof. The modules can be directly coupled with no intervening structures or objects other than the connector there-between, or indirectly coupled.

The observation module 402 is configured to determine information regarding physical surroundings of the first device 102 of FIG. 1 or a vehicle or an object associated thereto. The observation module 402 can observe the physical surroundings by determining the object movement indicator 218 of FIG. 2 such as the detected information 220 of FIG. 2.

The observation module 402 can determine the detected information 220 using the first device 102, the surroundings detector 110 of FIG. 1 thereon, or a combination thereof. The observation module 402 can determine the detected information 220 based on detecting or observing the environment surrounding the first device 102, the surroundings detector 110, or a combination thereof.

The observation module 402 can determine the detected information 220 for representing the maneuverable object 202 of FIG. 2 located within the surrounding area or within the LOS from the first device 102 or the vehicle or the object associated thereto. For example, the observation module 402 can determine the detected information 220 as the visual image, the point cloud, or a combination thereof from the surroundings detector 110, such as the visual detector 112 of FIG. 1, the camera set 116 of FIG. 1, the distance detector 114 of FIG. 1, or a combination thereof of the first device 102.

The observation module 402 can determine the detected information 220 for a variety of situations. For example, the observation module 402 can determine the detected information 220 including representation of or one or more portions corresponding to the maneuverable object 202 located in the surrounding area or physical environment relative to the first device 102, or the vehicle or the object associated thereto.

Also for example, the observation module 402 can determine the detected information 220 for the first device 102, or the vehicle or the object associated thereto, maneuvering without real-time control from the operator 108 of FIG. 1. The observation module 402 can determine the detected information 220 from perspective of or for a remote controlled vehicle or the autonomous or self-maneuvering vehicle including the first device 102. The observation module 402 can determine the detected information 220 from perspective of or for a passenger vehicle with the first device 102 therein, such as end-user device for mobile phones or vehicle-integrated infotainment system.

The observation module 402 can further determine the object movement indicator 218 based on receiving the status information 222 of FIG. 2. The observation module 402 can receive the status information 222 from or transmitted by the maneuverable object 202, the first device 102, or a combination thereof reporting information regarding its own location, position, movement, or a combination thereof. The observation module 402 can receive the status information 222 at the first device 102, the second device 106 of FIG. 1, or a combination thereof.

The navigation system 100 can analyze the detected information 220, the status information 222, or a combination thereof at or using the first device 102, the second device 106, or a combination thereof. The result of the analysis can be implemented or applied to the first device 102, or the vehicle or the object associated thereto, or a combination thereof. Details regarding the analysis, the implementation, application, or a combination thereof are discussed below.

The observation module 402 can use the surroundings detector 110, the first user interface 318 of FIG. 3, the second user interface 338 of FIG. 3, the first communication circuit 316 of FIG. 3, the second communication circuit 336 of FIG. 3, the first control circuit 312 of FIG. 3, the second control circuit 334 of FIG. 3, or a combination thereof to determine the object movement indicator 218. The observation module 402 can store the object movement indicator 218 in the first storage circuit 314 of FIG. 3, the second storage circuit 346 of FIG. 3, or a combination thereof.

After determining information regarding physical surroundings, the control flow can pass from the observation module 402 to the identification module 404. For example, the control flow can pass by having a processing result, such as the object movement indicator 218 or a portion thereof as an output from the observation module 402 to an input of the identification module 404.

Also for example, the control flow can further pass by storing the processing result at a location known and accessible to the identification module 404. Also for example, the control flow can further pass by notifying the identification module 404, such as by using a flag, an interrupt, a status signal, or a combination thereof. Also for example, the control flow can further pass using a combination of the processes described above.

The identification module 404 is configured to analyze the information regarding the surroundings of the first device 102, or the vehicle or the object associated thereto. The identification module 404 can analyze the object movement indicator 218, such as the detected information 220, the status information 222, or a combination thereof.

The identification module 404 can analyze the object movement indicator 218 based on identifying the maneuverable object 202, one or more portions thereof, or a combination thereof represented therein. The identification module 404 can further locate the object movement indicator 218 for the corresponding geographical area or location, along with the map information 242 of FIG. 2 corresponding thereto. The identification module 404 can analyze using an object module 412, a portion module 414, a map module 416, or a combination thereof.

The object module 412 is configured to identify the maneuverable object 202 represented in the object movement indicator 218 or the portion thereof corresponding to the maneuverable object 202. The object module 412 can identify the maneuverable object 202, such as a vehicle, a drone, a self-propelled or maneuverable vessel, or a combination thereof, in the object movement indicator 218 or a portion thereof.

The object module 412 can identify in a variety of ways. For example, the object module 412 can identify based on a pattern recognition or matching mechanism, an image recognition mechanism, a machine-learning mechanism, a threshold or an outline pattern representing possible instances of the maneuverable object 202, or a combination thereof. As a more specific example, the object module 412 can identify based on recognizing or matching outlines, shapes, colors, sizes or dimensions, or a combination thereof in the object movement indicator 218 to patterns, thresholds, templates, or a combination thereof corresponding thereto representing the maneuverable object 202.

The object module 412 can further identify the maneuverable object 202 based on identifying a type, a class, an identification information, or a combination thereof for the maneuverable object 202. For example, the object module 412 can identify by recognizing vehicle names, such as license information or model number of the specific instance of the maneuverable object 202.

Also for example, the object module 412 can identify by recognizing the maneuverable object 202 as a terrestrial vehicle, a marine vehicle, an aerial vehicle, or a combination thereof. As a more specific example, the object module 412 can identify by recognizing the maneuverable object 202 as a wheeled vehicle, a helicopter, or a quadcopter.

The portion module 414 is configured to identify one or more specific portions of the maneuverable object 202 represented in the object movement indicator 218 or the portion thereof corresponding to the one or more specific portions. The portion module 414 can identify the one or more specific portions, such as the propulsion portion 204 of FIG. 2, the directional portion 206 of FIG. 2, the reference portion 208 of FIG. 2, or a combination thereof of the maneuverable object 202 represented in the object movement indicator 218 or the portions of the object movement indicator 218 corresponding thereto.

The portion module 414 can identify the one or more specific portions based on or from the object movement indicator 218. For example, the portion module 414 can identify the directional portion 206, the propulsion portion 204, or a combination thereof based on or from the detected information 220 for representing the directional portion 206 of the maneuverable object 202 controlling the object travel vector 214 of FIG. 2. Also for example, the portion module 414 can identify one or more instance of the reference portion 208 relative to the directional portion 206, the propulsion portion 204, or a combination thereof based on or from the detected information 220.

The portion module 414 can identify similar to the object module 412 but for specific portions instead of the overall object. For example, the portion module 414 can identify based on a pattern recognition or matching mechanism, an image recognition mechanism, a machine-learning mechanism, a threshold or an outline pattern representing possible instances of the various portions, or a combination thereof for the specific portions.

The portion module 414 can further identify the one or more specific portions based on or according to the identification of the maneuverable object 202. For example, the portion module 414 can use the mechanism, the threshold, the outline pattern, or a combination thereof representing possible instances of various portions, or a combination thereof specific to the identified instance of the maneuverable object 202.

As a more specific example, the portion module 414 can use the mechanism, the threshold, the outline pattern, or a combination thereof for one or more rotors or propellers, one or more flaps, or a combination thereof to identify the directional portion 206 when the maneuverable object 202 is identified as a helicopter or a quadcopter. Also as a more specific example, the portion module 414 can use the mechanism, the threshold, the outline pattern, or a combination thereof for one or more wheel outlines to identify the directional portion 206 when the maneuverable object 202 is identified as a wheeled vehicle.

The map module 416 is configured to determine the map information 242 of FIG. 2 associated with the maneuverable object 202. The map module 416 can determine the map information 242 in a variety of ways.

For example, the map module 416 can determine the map information 242 based on the current location of the first device 102. The map module 416 can use the location circuit 320 of FIG. 3, the first control circuit 312, the control circuit 334, the first communication circuit 316, the second communication circuit 336, or a combination thereof to determine the current location of the first device 102. The map module 416 can determine the map information 242 associated with the current location of the first device 102 based on accessing the portion of the map corresponding to the current location.

Also for example, the map module 416 can determine the map information 242 based on recognizing physical or geographical markers in the detected information 220. The map module 416 can identify and match street signs, POI signs, landmarks, road characteristics, or a combination thereof depicted or represented in the detected information 220. The map module 416 can utilize thresholds, patterns, templates, or a combination there of predetermined by the navigation system 100 to determine the map information 242 from the detected information 220.

The identification module 404 can use one or more control circuits discussed above to analyze the information regarding the surroundings. The identification module 404 can further communicate or access information regarding the surroundings between devices using one or more communication circuits discussed above. The identification module 404 can further store the information in one or more storage circuits discussed above.

After analyzing the information regarding the surroundings, the control flow can pass from the identification module 404 to the calculation module 406. The control flow can pass in a manner similar to the manner described above between the observation module 402 and the identification module 404, but using the processing results of the identification module 404, such as the identified instances of the maneuverable object 202, one or more portions thereof, a detail or a location thereof within the object movement indicator 218, other processing results, or a combination thereof.

The calculation module 406 is configured to analyze information associated with movement of the maneuverable object 202. The calculation module 406 can analyze for physical orientation or location of the maneuverable object 202 or its spatial relationship to the first device 102. The calculation module 406 can further analyze based on measuring angles, arrangements or relative locations or orientations between various portions, magnitude or speed for one or more portions, or a combination thereof. The calculation module 406 can include an overall movement module 418, a portion measurement module 420, a history module 422, or a combination thereof for analyzing the movement information.

The overall movement module 418 is configured to determine the physical orientation or location of the maneuverable object 202. The overall movement module 418 can determine the physical orientation or location based on generating the object movement profile 210 of FIG. 2 for describing movement of the maneuverable object 202. The overall movement module 418 can generate the object movement profile 210 including the object location 212 of FIG. 2, the object travel vector 214 of FIG. 2, the object-relative relationship 216 of FIG. 2, or a combination thereof.

The overall movement module 418 can generate the object movement profile 210 based on the status information 222 from the maneuverable object 202. The maneuverable object 202 can report the object location 212, the object travel vector 214, or a combination thereof using the status information 222.

The overall movement module 418 can further generate the object movement profile 210 based on the detected information 220. The overall movement module 418 can further generate the object movement profile 210 based on the reference portion 208 of the maneuverable object 202.

The overall movement module 418 can determine the object location 212 based on combining the current location of the first device 102 and a distance, a location, a relative position, or a combination thereof for the reference portion 208 represented by the detected information 220. The overall movement module 418 can determine the object travel vector 214 based on displacement or orientation of the reference portion 208 from the portion measurement module 420.

The overall movement module 418 can further generate the object movement profile 210 based on recordings or history of the maneuverable object 202 leading up to the current time. For example, the overall movement module 418 can determine the object location 212, the object travel vector 214, or a combination thereof based on a difference between a previous instance of the detected information 220 and the current instance thereof. Also for example, the overall movement module 418 can determine the object location 212, the object travel vector 214, or a combination thereof based on a processing result for movement at a previous time or iteration.

The overall movement module 418 can determine the object-relative relationship 216 based on a variety of information including the current location or orientation of the first device 102, the map information 242, the detected information 220, the status information 222, the object location 212, the object travel vector 214, or a combination thereof. The overall movement module 418 can determine a distance, a difference in heading or orientation, a relative locations or spatial arrangement, or a combination thereof between the first device 102 and the maneuverable object 202 as the object-relative relationship 216.

For example, the overall movement module 418 can categorize the maneuverable object 202 as being in front, behind, left, right, or a combination thereof relative to the first device 102, or the vehicle or object associated thereto. Also for example, the overall movement module 418 can determine a lane of travel of the maneuverable object 202, a separation distance between the reference portion 208 and the first device 102, a number of travel lanes existing between the first device 102 and the maneuverable object 202, or a combination thereof.

Also for example, the overall movement module 418 can determine an angle or a difference in angles between heading, direction of travel, the reference portion 208, or a combination thereof for the first device 102 and the maneuverable object 202. Also for example, the overall movement module 418 can determine a difference between speed, acceleration, magnitude, size, or a combination thereof for the first device 102 and the maneuverable object 202. The overall movement module 418 can use template, threshold, pattern, mechanism, or a combination thereof predetermined by the navigation system 100 to generate the object movement profile 210.

The portion measurement module 420 is configured to analyze specific portion of the maneuverable object 202 with respect to movement. The portion measurement module 420 can analyze the propulsion portion 204, the directional portion 206, the reference portion 208, or a combination thereof.

The portion measurement module 420 can determine the directional characteristic 224 of FIG. 2 corresponding to the propulsion portion 204, the directional portion 206, or a combination thereof specific to the maneuverable object 202. The portion measurement module 420 can determine the directional characteristic 224 based on the directional portion 206, the propulsion portion 204, or a combination thereof represented in the detected information 220.

The portion measurement module 420 can determine the directional characteristic 224 by determining a category or a set of outlines, thresholds, templates, mechanisms, or a combination thereof representing or corresponding to the directional portion 206 or the propulsion portion 204 specific to the maneuverable object 202. For example, the portion measurement module 420 can determine the directional characteristic 224 as orientation of front wheel for analyzing wheeled vehicles.

Also for example, the portion measurement module 420 can determine the directional characteristic 224 as an orientation or an angle of one or more specific flaps or rudders, a magnitude or a rate of rotation for one or more specific rotors or propellers, an orientation or a physical configuration of plane or rotation or thrust direction, or a combination thereof for non-terrestrial vehicles. The portion measurement module 420 can also determine the directional characteristic 224 for a mechanism or a process for processing blur sizes associated with rotors or propellers or measuring angles or directions, such as for a rotational plane or a thruster direction, or a combination thereof.

The portion measurement module 420 can measure or calculate directional traits or characteristics of the directional portion 206 or the propulsion portion 204 from the detected information 220. The portion measurement module 420 can measure or calculate by calculating the reference measurement 230 of FIG. 2, the directional measurement 232 of FIG. 2, or a combination thereof. The portion measurement module 420 can calculate the reference measurement 230, the directional measurement 232, or a combination thereof from the detected information 220, or a combination thereof.

The portion measurement module 420 can calculate the reference measurement 230, the directional measurement 232, or a combination thereof based on calculating an angle, a rate, a magnitude, an alignment, or a combination thereof for the directional portion 206, the propulsion portion 204, or a combination thereof from the detected information 220. The portion measurement module 420 can calculate the reference measurement 230, the directional measurement 232, or a combination thereof based on the directional characteristic 224.

For example, the portion measurement module 420 can calculate the directional measurement 232 as an angle or a direction based on a shape of the wheel outline, an exposed amount of a flat or tread portion, a distance between the wheel outline and a surface or line for the reference portion 208, or a combination thereof included in or indicated by the directional characteristic 224. The portion measurement module 420 can calculate based on of the directional portion 206 from the detected information 220 according to the directional characteristic 224.

Also for example, the portion measurement module 420 can calculate the directional measurement 232 as the rotor magnitude, propeller speed, a propeller angle or thickness, an angle for the plane or rotation, or a combination thereof for rotors or propellers included in or indicated by the directional characteristic 224. The portion measurement module 420 can measure a blur size, a clarity, a brightness or a color density, a width or size, or a combination for one or more propeller blades or a portion, a marker, an indicator, or a combination thereof of the directional portion 206 or the propulsion portion 204 according to the directional characteristic 224. The portion measurement module 420 can use the measurement to calculate the rotational speed or force of the rotor or propeller blade.

The portion measurement module 420 can further calculate the portion change rate 228 of FIG. 2 of the directional portion 206. The portion measurement module 420 can calculate the portion change rate 228 based on the detected information 220 over time. The portion measurement module 420 can calculate the portion change rate 228 based on differences in the directional portion 206 or the directional measurement 232 corresponding to the detected information 220 determined at various different times, such as from the history module 422.

The portion measurement module 420 can calculate the portion change rate 228 based on the differences and a corresponding duration of time. The portion measurement module 420 can calculate the portion change rate 228 using an equation, a method, a process, a mechanism, or a combination thereof predetermined by the navigation system 100.

The portion measurement module 420 can similarly calculate the reference measurement 230. The portion measurement module 420 can calculate the reference measurement 230 based on analyzing the reference portion 208 from the detected information 220. For example, the portion measurement module 420 can analyze a direction, an orientation, a shape, an angle, a heading, or a combination thereof for the reference portion 208. The portion measurement module 420 can calculate the reference measurement 230 as the result of the analysis.

The history module 422 is configured to record information regarding portions, movements, or a combination thereof for the maneuverable object 202. The history module 422 can store the reference measurement 230, the directional measurement 232, the directional characteristic 224, the detected information 220, the portion change rate 228, or a combination thereof corresponding to a time, a location, or a combination thereof corresponding to the information.

The history module 422 can track information specific to one or more portion for one or more instances of the maneuverable object 202. The history module 422 can determine the portion-movement history 240 of FIG. 2 for tracking the directional portion 206 one or more instances of the maneuverable object 202 over a period of time. The history module 422 can further group or associate the instances of the information regarding the directional portion 206 across different times for the same instance of the maneuverable object 202.

The calculation module 406 can utilize processing results of one sub-module for another sub-module. For example, the portion measurement module 420 can utilize the portion-movement history 240 from the history module 422 to calculate the portion change rate 228. Also for example, the overall movement module 418 can utilize the directional measurement 232, the reference measurement 230, the portion-movement history 240, or a combination thereof to determine the object movement profile 210, such as for positioning, orientation, geographical location through dead-reckoning mechanism, or a combination thereof.

The calculation module 406 can use one or more control circuits discussed above to analyze information associated with movement of the maneuverable object 202. The calculation module 406 can further communicate or access information regarding the movement between devices using one or more communication circuits discussed above. The identification module 404 can further store the information in one or more storage circuits discussed above.

After analyzing the information associated with movement of the maneuverable object 202, the control flow can pass from the calculation module 406 to the object trajectory module 408. The control flow can pass in a manner similar to the manner described above between the observation module 402 and the identification module 404, but using the processing results of the calculation module 406, such as the directional characteristic 224, the portion change rate 228, the reference measurement 230, the directional measurement 232, a portion thereof, other processing results, or a combination thereof.

The object trajectory module 408 is configured to predict future movement of the maneuverable object 202. The object trajectory module 408 can predict based on or using the detected information 220, processing results thereof, or a combination thereof.

The object trajectory module 408 can classify or recognize characteristics or traits influencing movements of the maneuverable object 202. The object trajectory module 408 can further calculate an estimate for the likely future movement of the maneuverable object 202. The object trajectory module 408 can further compare the estimated movement with surrounding information. The object trajectory module 408 can include a classification module 424, a prediction module 426, a map comparison module 428, or a combination thereof.

The classification module 424 is configured to classify or recognize the characteristics or traits influencing movements of the maneuverable object 202. The classification module 424 can classify or recognize based on generating the object movement profile 210 for further categorizing or describing movement of the maneuverable object 202. For example, the classification module 424 can generate the object movement profile 210 including an autonomous-device status 430, a remote-controlled movement status 432, a passenger-controlled status 434, or a combination thereof.

The autonomous-device status 430 represents an indication that corresponding vehicle or object is an autonomously propelled or navigated vehicle or object. The autonomous-device status 430 can represent the maneuverable object 202. The autonomous-device status 430 can further represent the first device 102, or the vehicle or object associated thereto.

The remote-controlled movement status 432 represents an indication that corresponding vehicle or object is controlled and maneuvered from a location outside or external to the corresponding vehicle. The remote-controlled movement status 432 can indicate drones or vehicles controlled using wireless signals from a separate geographical location.

The passenger-controlled status 434 represents an indication that corresponding vehicle or object is controlled and maneuvered by the operator 108 within the corresponding vehicle. The passenger-controlled status 434 can indicate passenger-operated vehicles.

The classification module 424 can include a template, a pattern, a habit, or a combination thereof for the propulsion portion 204, the directional portion 206, or a combination thereof for recognizing movement behaviors or patterns typical of remote-control scenarios, drones or autonomous vehicles, passenger operated vehicles or a combination thereof. The classification module 424 can further utilize the identification of the maneuverable object 202, the status information 222 thereof, or a combination thereof to generate the object movement profile 210 corresponding to type of maneuver control for the maneuverable object 202.

The classification module 424 can further generate the object movement profile 210 for representing types of control patterns. The classification module 424 can generate the object movement profile 210 for representing patterns or types of operators in passenger-controlled vehicles or remote-controlled vehicles.

For example, the classification module 424 can generate the object movement profile 210 by categorizing the vehicle or object movement as being typical of a drunk or inebriated operator, a novice operator, a sleepy or tired operator, or a combination thereof. The classification module 424 can generate the object movement profile 210 similarly as described above. As a more specific example, the classification module 424 can use machine-learning or pattern recognition mechanism, a template or threshold, a training set, or a combination thereof predetermined by the navigation system 100 for recognizing various categorical behaviors associated with maneuvering the maneuverable object 202.

The prediction module 426 is configured to calculate the estimate for the likely future movement of the maneuverable object 202. The prediction module 426 can calculate the estimate based on calculating the estimated trajectory profile 226 of FIG. 2 including the estimated object direction 236 of FIG. 2, the magnitude estimate 238 of FIG. 2, or a combination thereof. The prediction module 426 can calculate the estimated trajectory profile 226 for predicting movement of the maneuverable object 202.

The prediction module 426 can calculate the estimated trajectory profile 226 based on the directional portion 206, the directional characteristic 224 thereof, or a combination thereof represented in the object movement indicator 218 including the detected information 220. The prediction module 426 can calculate the estimated trajectory profile 226 based on the directional measurement 232, the reference measurement 230, or a combination thereof corresponding to the object movement indicator 218.

For example, the prediction module 426 can calculate the estimated trajectory profile 226 as the directional measurement 232. As a more specific example, the prediction module 426 can calculate the estimated object direction 236 of the estimated trajectory profile 226 as the direction or orientation of the front tires of the vehicle as indicated by the directional measurement 232. The prediction module 426 can further calculate the magnitude estimate 238 based on the portion change rate 228, the object movement profile 210 including the object travel vector 214 or the magnitude thereof, or a combination thereof.

Also for example, the prediction module 426 can calculate the estimated trajectory profile 226 based on calculating the directional difference 234 of FIG. 2 between the directional measurement 232 and the reference measurement 230. The prediction module 426 can calculate the estimated trajectory profile 226 as or based on the directional difference 234.

As a more specific example, the prediction module 426 can calculate the directional difference 234 based on an amount of tread portion of the tire corresponding to the directional measurement 232 extending past the fender or the vehicle body corresponding to the reference portion 208. The prediction module 426 can calculate the estimated object direction 236 based on the directional difference 234. The prediction module 426 can further calculate the magnitude estimate 238 similarly as exemplified above.

Also as a more specific example, the prediction module 426 can calculate the directional difference 234 based on calculating a difference in rotational speed or momentum of rotors or blades. The prediction module 426 can calculate the estimated object direction 236 based on relative location or arrangement of the rotor or propellers with higher rotational speed or momentum. The prediction module 426 can calculate the magnitude estimate 238 based on the difference in magnitude in the rotational speed or momentums between the faster rotor or propellers and the reference speed or momentum.

The prediction module 426 can further calculate the estimated trajectory profile 226 based on the object movement profile 210 along with the directional portion 206. For example, the prediction module 426 can normalize the directional difference 234 or the directional measurement 232 based on the current corresponding movement, orientation, or a combination thereof for the maneuverable object 202. As a more specific example, the prediction module 426 can identify likely movement of the overall mass of the maneuverable object 202 including orientation or alignment change relative to preceding time, along with physical displacement of the overall mass.

Also for example, the prediction module 426 can account for types of controls, such as the autonomous-device status 430, the remote-controlled movement status 432, the passenger-controlled status 434, or a combination thereof. As a more specific example, the prediction module 426 can account for human or device limitations, such as for gravitational force, reaction time, typical movement behaviors of people, movement or maneuver protocols for devices, or a combination thereof.

The prediction module 426 can further calculate the estimated trajectory profile 226 based on the portion change rate 228, the portion-movement history 240, or a combination thereof describing movement of one or more portions over time. For example, the magnitude estimate 238 can be based on the portion change rate 228 discussed above.

Also for example, the portion change rate 228, the portion-movement history 240, or a combination thereof can be used to predict likely change in future instances of the directional measurement 232 in calculating the estimated object direction 236 representing the trajectory of the maneuverable object 202 over time. As a more specific example, the estimated trajectory profile 226 can be based on template or patterns predetermined by the navigation system 100 to represent common set of movements, such as involving initiation of change in direction, maintained maneuver, and then correctional maneuver to end a maneuver or an adjustment. The predetermined patterns or templates can correspond to turns, lane changes, ascent or descent, stop, acceleration from stop, or a combination thereof.

Continuing with the example, the prediction module 426 can identify partial matches for initial portions of the patterns or templates with the portion change rate 228, the portion-movement history 240, the current instances of the directional measurement 232 or the reference measurement 230, current instance of the object movement profile 210, or a combination thereof. The prediction module 426 can use the remaining portions of the patterns or templates to calculate the estimated trajectory profile 226 to represent a likely trajectory of the maneuverable object 202 at the current time and afterwards.

The map comparison module 428 is configured to compare the estimated movement with surrounding information. The map comparison module 428 can compare the estimated trajectory profile 226 to the map information 242 corresponding to the current location of the first device 102, the maneuverable object 202, or a combination thereof.

For example, the map comparison module 428 can compare the estimated trajectory profile 226 including the estimated object direction 236, the magnitude estimate 238, the estimated future geographic locations corresponding thereto, or a combination thereof to lane markers, shape or direction of the road or path, or a combination thereof. The map comparison module 428 can determine whether the estimated trajectory profile 226 aligns with the map information 242. The map comparison module 428 can determine a status or an indicator when the estimated trajectory profile 226 indicates that the maneuverable object 202 is estimated to not follow the lane or the road as indicated by the map information 242 according to the comparison.

The object trajectory module 408 can use one or more control circuits described above to predict the future movement of the maneuverable object 202, such as with the estimated trajectory profile 226, as discussed above. The object trajectory module 408 can use one or more communication circuits discussed above to communicate and exchange the estimated trajectory profile 226 or a portion thereof. The object trajectory module 408 can further store the estimated trajectory profile 226 or a portion thereof in one or more of the storage circuits as discussed above.

After predicting the future movement, the control flow can pass from the object trajectory module 408 to the planning module 410. The control flow can pass in a manner similar to the manner described above between the observation module 402 and the identification module 404, but using the processing results of the object trajectory module 408, such as the estimated trajectory profile 226, a portion thereof, other processing results, or a combination thereof.

The planning module 410 is configured to determine a response for the first device 102, or a vehicle or an object associated thereto, in light of the predicted movement of the maneuverable object 202. The planning module 410 can determine the response based on generating, implementing, communicating, or a combination thereof for the motion plan profile 244 of FIG. 2.

The planning module 410 can process the motion plan profile 244 for controlling the first device 102 in response to estimated movement of the maneuverable object 202 as represented by the estimated trajectory profile 226. The planning module 410 can process the motion plan profile 244 based on the estimated trajectory profile 226. For example, the planning module 410 can determine an existing course 436 for the first device 102, determine a collision event 438 based on the existing course 436 and the estimated trajectory profile 226, generate a responsive course 440, or a combination thereof.

The existing course 436 can include a set of locations planned to be traversed by the first device 102, or the vehicle or the object associated thereto. The existing course 436 can include the current location, the travel route or path planned subsequent to the current location, one or more maneuvers or movements scheduled after the current time, or a combination thereof.

The existing course 436 can be part of a navigational route, but in a smaller scale, such as for focusing on lane-level or real-time maneuvering. The planning module 410 can determine the existing course 436 based on accessing the overall navigation route or queued maneuvers or control signals, calculating or estimating the location based on the map information 242 and the travel direction or destination, or a combination thereof.

The collision event 438 can include an indication for estimated or likely overlap between trajectory of the first device 102 and the trajectory of the maneuverable object 202 at a future time. The collision event 438 can represent a likely possibility of the first device 102, or the vehicle or the object associated thereto, colliding with the maneuverable object 202 after movement thereof corresponding to the current instance of the directional measurement 232.

The planning module 410 can determine the collision event 438 based on the estimated trajectory profile 226 processed from the detected information 220 representing the propulsion portion 204, the directional portion 206, or a combination thereof of the maneuverable object 202 in real-time. The planning module 410 can determine the collision event 438 based on comparing the existing course 436 with the estimated trajectory profile 226 including the estimated object direction 236, the magnitude estimate 238, a processing result or course corresponding thereto, or a combination thereof. The planning module 410 can issue or signal the collision event 438 when the existing course 436 and the estimated trajectory profile 226 overlap or cross.

The responsive course 440 is a sequence of geographical locations, a set of movements or maneuvers, a set of control signals or instructions corresponding thereto, or a combination thereof for adjusting to the estimated movement of the maneuverable object 202. The responsive course 440 can include an adjustment to or a replacement for the existing course 436.

The planning module 410 can generate the motion plan profile 244 including the responsive course 440 based on the estimated trajectory profile 226, the existing course 436, the collision event 438, the map information 242, or a combination thereof. For example, the planning module 410 can generate the motion plan profile 244 to avoid the estimated trajectory profile 226 based on identifying or determining the collision event 438.

Also for example, the planning module 410 can generate the motion plan profile 244 based on comparing the existing course 436 with the estimated trajectory profile 226, the map information 242, or a combination thereof. The planning module 410 can generate the motion plan profile 244 when the existing course 436 is within a threshold distance from the estimated trajectory profile 226. The threshold distance can be specific to or based on the map information 242, such as for narrower lanes, at curves, near a required stop, current lane or location for the first device 102 or the maneuverable object 202, or a combination thereof.

Continuing with the example, the planning module 410 can generate the motion plan profile 244 to update, adjust, or replace the existing course 436 to be outside of the threshold distance based on the map information 242. The planning module 410 can further generate the motion plan profile 244 specific to the current location or projected potential location of the first device 102 or the maneuverable object 202. As a more specific example, the planning module 410 can generate the motion plan profile 244 specifically for school zones, bridges, one-way segments, curves, highways, rural roads, local roads, within a specific distance from a potential stop, particular lanes, or a combination thereof.

Continuing with the example, the planning module 410 can generate the motion plan profile 244 specific to context or current situation associated with the current location or occurrence. For example, the planning module 410 can generate the motion plan profile 244 based on preference of the operator 108 associated with the first device 102, the object-relative relationship 216 resulting from comparing and processing the object movement profile 210 and the estimated trajectory profile 226 with the current location and orientation of the first device 102, the object movement indicator 218, other information regarding surrounding environment, a history or a sequence thereof, or a combination thereof.

The planning module 410 can generate the motion plan profile 244 by calculating one or a sequence of locations, one or more maneuvers or movements, one or more control signals or instructions corresponding thereto, or a combination thereof for geographical location of the first device 102 at the future time. The planning module 410 can generate the motion plan profile 244 calculate for avoiding the estimated trajectory profile 226 or a threshold buffer area around it.

The planning module 410 can further generate the motion plan profile 244 can calculate based on comparing one or more locations or maneuvers corresponding timing, a sequence thereof, or a combination thereof and a corresponding risk value. For example, the planning module 410 can evaluate various locations, set maneuvers, such as stop or swerve left or right, or a combination thereof.

Continuing with the example, the planning module 410 can calculate a risk factor or rating for each location or maneuvers using a predetermined scale, equation, method, process, scenarios or templates, or a combination thereof. The planning module 410 can generate the motion plan profile 244 based on selecting the locations, the maneuvers, a sequence or a timing thereof, or a combination thereof based on maximizing the safety, minimizing a potential collision, or a combination thereof according to the risk factor.

The planning module 410 can further implement the motion plan profile 244. The planning module 410 can implement based on communicating the motion plan profile 244, executing the motion plan profile 244, or a combination thereof.

For example, the planning module 410 can communicate the motion plan profile 244 or a portion thereof between devices. As a more specific example, the motion plan profile 244 or a portion thereof can be processed at the second device 106 and sent to the first device 102 using one or more of the communication circuits.

Also as a more specific example, the motion plan profile 244 or a portion therein can be communicated to the operator 108 or a passenger through the first device 102, the second device 106, another device, or a combination thereof for maneuvering the first device 102, or the vehicle or the object associated thereto. The navigation system 100 can notify the operator 108 to take evasive actions, such as stop or swerve, by communicating a notice or an alert to the operator 108 using the motion plan profile 244. The navigation system 100 can further notify the passenger that the evasive actions are about to take place, is currently taking place, or have taken place with the vehicle or object associated thereto.

Also for example, the planning module 410 can implement by executing the motion plan profile 244 to physically move and maneuver the first device 102, or the vehicle or object associated thereto. The planning module 410 can send control signals, apply or control forces or movements for circuits or actuators, or a combination thereof according to the motion plan profile 244 to maneuver or physically move the first device 102, or the vehicle or object associated thereto.

The planning module 410 can use one or more of the control circuits discussed above to generate, implement, or a combination thereof for the motion plan profile 244. The planning module 410 can use one or more of the communication circuits, one or more of the user interfaces, or a combination thereof discussed above to communicate the motion plan profile 244. The planning module 410 can further store the motion plan profile 244 in one or more of the storage circuits discussed above.

It has been discovered that calculating the estimated trajectory profile 226 based on the directional portion 206, the propulsion portion 204, or a combination thereof of the maneuverable object 202 represented in the detected information 220 provides increased accuracy and reliability in predicting movement of the maneuverable object 202 to improve safety. The detected information 220 can be captured in real-time to represent current and up-to-date status and movement of the maneuverable object 202. The detected information 220 can be analyzed to identify the directional portion 206, the propulsion portion 204, or a combination thereof of the maneuverable object 202. The detected information 220 can further be analyzed to process the estimated trajectory profile 226 including the directional measurement 232, the directional difference 234, or a combination thereof to predict resulting future location, movement, or trajectory of the maneuverable object 202 based on real-time physical status directly affecting the location, movement, or trajectory.

It has also been discovered that generating the motion plan profile 244 based on the estimated trajectory profile 226 provides increased safety for the first device 102, or any person or property associated thereto. The navigation system 100 can generate the motion plan profile 244 in response to the estimated trajectory profile 226 to avoid any potential collisions or dangers between the first device 102 and the maneuverable object 202. The navigation system 100 can perform motion planning based on generating the motion plan profile 244 using real-time data specific to real-time physical status of the maneuverable object 202 directly affecting the location, movement, or trajectory thereof.

It has also been discovered that the portion-movement history 240 specific to one or more portions of the maneuverable object 202, such as for the directional portion 206, the propulsion portion 204, or a combination thereof provides increased accuracy in predicting movement of the maneuverable object 202. The portion-specific history or record can be used to identify patterns specific for the propulsion portion 204, the directional portion 206, or a combination thereof corresponding to the operator 108 or corresponding to the autonomous-device status 430. The patterns can be used to predict future movements. Further, the portion-specific history or record can be used to calculate the portion change rate 228 to accurately predict movement or changes of the propulsion portion 204, the directional portion 206, or a combination thereof, leading to increased accuracy in predicting the future movement or location of the maneuverable object 202.

The modules described in this application can be hardware implementation or hardware accelerators, including passive circuitry, active circuitry, or both, in the first storage circuit 314, the second storage circuit 346, the first control circuit 312, the second control circuit 334, or a combination thereof. The modules can also be hardware implementation or hardware accelerators, including passive circuitry, active circuitry, or both, within the first device 102, the second device 106, or a combination thereof but outside of the first storage circuit 314, the second storage circuit 346, the first control circuit 312, the second control circuit 334, or a combination thereof.

The navigation system 100 has been described with module functions or order as an example. The navigation system 100 can partition the modules differently or order the modules differently. For example, the observation module 402 and the identification module 404 can be combined. Also for example, the classification module 424 can be included in the calculation module 406, the overall movement module 418 can be included in the identification module 404, or a combination thereof.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 314, the second storage circuit 346, or a combination thereof can represent the non-transitory computer readable medium. The first storage circuit 314, the second storage circuit 346, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the detected information 220, representing the physical object or vehicle for the maneuverable object 202, into the directional characteristic 224, the estimated trajectory profile 226, the motion plan profile 244, or a combination thereof results in the movement in the physical world, such as physical change in location or orientation of the first device 102. Movement in the physical world results in updates to current location of the first device 102, the maneuverable object 202, or a combination thereof, which can be fed back into the navigation system 100 through updated instance of the detected information 220.

Figure 5:
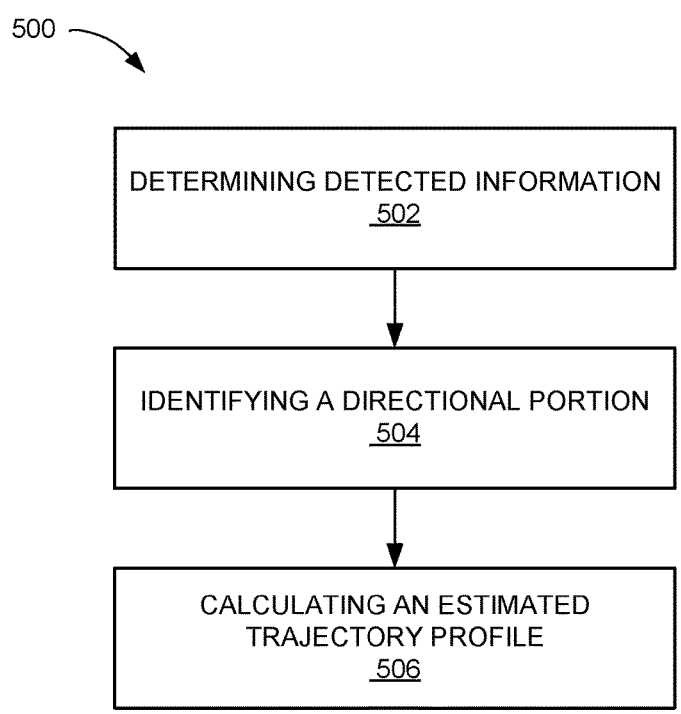
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: determining detected information for representing a maneuverable object detected using a device in a block 502; identifying a directional portion based on the detected information for representing directional portion controlling an object travel vector of the maneuverable object in a block 504; and calculating with a control circuit an estimated trajectory profile based on the directional portion for predicting movement of the maneuverable object in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
    determining detected information for representing a maneuverable object capable of self-propelled physical movement or displacement, detected using a device;
    identifying a directional portion based on the detected information for representing directional portion controlling an object travel vector of the maneuverable object; and
    calculating with a control circuit an estimated trajectory profile based on the directional portion for predicting movement of the maneuverable object, wherein the estimated trajectory profile includes a reference measurement, and wherein the reference measurement is calculated based on an angle relative to a surface of the maneuverable object.

2. The method as claimed in claim 1 further comprising:
    determining a directional characteristic of the directional portion from the detected information; and
    wherein calculating the estimated trajectory profile includes:
    calculating the estimated trajectory profile based on the directional characteristic.

3. The method as claimed in claim 1 further comprising generating a motion plan profile based on the estimated trajectory profile for controlling the device in response to estimated movement of the maneuverable object.

4. The method as claimed in claim 1 wherein determining the detected information includes determining the detected information using the device corresponding to an autonomous-device status for representing the device maneuvering without real-time control from an operator.

5. The method as claimed in claim 1 wherein calculating the estimated trajectory profile includes calculating the estimated trajectory profile based on an object movement profile along with the directional portion, the object movement profile for representing movement of overall mass of the maneuverable object up to a current time.

6. The method as claimed in claim 1 wherein determining the detected information includes determining the detected information using a surroundings detector including a camera set, a distance detector, or a combination thereof of the device.

7. The method as claimed in claim 6 further comprising:
    determining a directional characteristic including a wheel outline, a relative shape, a rotor magnitude, or a combination thereof of the directional portion from the detected information; and
    wherein calculating the estimated trajectory profile includes:
    calculating the estimated trajectory profile based on the directional characteristic.

8. The method as claimed in claim 6 further comprising generating a motion plan profile based on the estimated trajectory profile and the object movement profile along with map information.

9. The method as claimed in claim 6 further comprising:
determining a portion-movement history for tracking the directional portion over time; and
generating the object movement profile for categorizing movement of the maneuverable object.

10. The method as claimed in claim 6 further comprising:
calculating a portion change rate of the directional portion based on the detected information over time; and
wherein calculating the estimated trajectory profile includes:
calculating the estimated trajectory profile based on the portion change rate.

11. A navigation system comprising:
a control circuit configured to:
determine detected information for representing a maneuverable object capable of self-propelled physical movement or displacement, detected using a device,
identify a directional portion based on the detected information for representing directional portion controlling an object travel vector of the maneuverable object,
calculate an estimated trajectory profile based on the directional portion for predicting movement of the maneuverable object, wherein the estimated trajectory profile includes a reference measurement, and wherein the reference measurement is calculated based on an angle relative to a surface of the maneuverable object; and
a storage circuit, coupled to the control circuit, configured to store the estimated trajectory profile.

12. The system as claimed in claim 11 wherein the control circuit is configured to:
determine a directional characteristic of the directional portion from the detected information; and
calculate the estimated trajectory profile based on the directional characteristic.

13. The system as claimed in claim 11 wherein the control circuit is configured to generate a motion plan profile based on the estimated trajectory profile for controlling the device in response to estimated movement of the maneuverable object.

14. The system as claimed in claim 11 wherein the control circuit is configured to determine the detected information using the device corresponding to an autonomous-device status for representing the device maneuvering without real-time control from an operator.

15. The system as claimed in claim 11 further comprising a surroundings detector coupled to the control circuit, the surroundings detector including a camera set, a distance detector, or a combination thereof configured to determine the detected information.

16. A non-transitory computer readable medium including instructions for a navigation system comprising:
determining detected information for representing a maneuverable object capable of self-propelled physical movement or displacement, detected using a device;
identifying a directional portion based on the detected information for representing directional portion controlling an object travel vector of the maneuverable object; and
calculating an estimated trajectory profile based on the directional portion for predicting movement of the maneuverable object, wherein the estimated trajectory profile includes a reference measurement, and wherein the reference measurement is calculated based on an angle relative to a surface of the maneuverable object.

17. The non-transitory computer readable medium including the instructions as claimed in claim 16 further comprising:
determining a directional characteristic of the directional portion from the detected information; and
wherein calculating the estimated trajectory profile includes:
calculating the estimated trajectory profile based on the directional characteristic.

18. The non-transitory computer readable medium including the instructions as claimed in claim 16 further comprising generating a motion plan profile based on the estimated trajectory profile for controlling the device in response to estimated movement of the maneuverable object.

19. The non-transitory computer readable medium including the instructions as claimed in claim 16 wherein determining the detected information includes determining the detected information using the device corresponding to an autonomous-device status for representing the device maneuvering without real-time control from an operator.

20. The non-transitory computer readable medium including the instructions as claimed in claim 16 wherein determining the detected information includes determining the detected information using a surroundings detector including a camera set, a distance detector, or a combination thereof of the device.

* * * * *